United States Patent Office 3,038,875
Patented June 12, 1962

3,038,875
REACTION PRODUCT OF AN AMINOSILANE, A POLYEPOXY COMPOUND AND AN ORGANIC POLYHYDROXY COMPOUND, AND METHOD FOR PREPARING SAME
William M. Boyer, Tinley Park, Hyman M. Molotsky, Chicago, and Harlan E. Tarbell, Jr., Elmhurst, Ill., assignors to The Richardson Company, Melrose Park, Ill., a corporation of Ohio
No Drawing. Filed July 13, 1959, Ser. No. 826,455
24 Claims. (Cl. 260—42)

This invention relates to new resinous compositions derived from what may be referred to as a three component system and, more particularly, to such a system wherein the three components are, in essence, hydroxyl groups, epoxy groups and functional units wherein nitrogen is united to silicon.

The present three component system is to be distinguished from somewhat analogous two component systems which have been heretofore proposed. Thus, in the copending application of Shultz et al., Serial No. 670,631, filed July 9, 1957, now abandoned, there is disclosed and claimed new compositions resulting from the reaction of compounds containing epoxy groups with compounds containing the silicon-nitrogen bond. Correspondingly, others have proposed compositions derived from the reaction of compounds containing hydroxyl groups with compounds containing the silicon-nitrogen bond, reactions of this type being disclosed and claimed in the copending application of Boyer et al., Serial No. 775,350. As indicated, the present application relates to an improvement on either of the foregoing two component systems and offers certain advantages not otherwise obtainable in such systems, especially in the formation of new intermediate or final resinous compositions capable of being used for the production of films, adhesives, castings and laminated or molded articles having enhanced properties.

The present invention may be briefly summarized as being concerned with new complex resinous compositions comprising the product of reaction of: (1) the reaction product of a member of the class consisting of ammonia and a primary amine with a halosilane wherein the reaction product contains an Si—N bond; (2) an epoxy compound; and (3) a hydroxyl compound, the order of reaction of the three components being variable and determined by the properties desired in the end products.

The hydroxyl component of the present system may be selected from numerous organic compounds, which preferably contain an average of more than one hydroxyl group per molecule. Illustrative of such polyhydroxy compounds are ethylene glycol, resorcinol, bisphenols, pentaerythritol, starch, polyvinyl alcohol and certain resinous compositions containing hydroxyl groups, for example, novolaks (permanently fusible, acid-catalyzed condensation products of an aldehyde with a phenol, such as phenol, cresols and xylenols).

The epoxy component contemplated contains the epoxy or oxirane group.

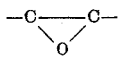

which is a well-known functional group occurring in numerous compounds, such as the alkylene oxides, illustrative of which are: ethylene oxide, styrene oxide, butadiene dioxide and 9,10 epoxy stearic acid; and glycidyl ethers, such as are derived from the reaction of epichlorohydrin with hydroxy compounds, for example, allyl alcohol, phenol, glycerol, and polyhydroxy phenols, exemplary of which are the bisphenols, resorcinol and novolaks. Preferably, polyepoxy compounds, of the foregoing type containing an average of more than one epoxy group per molecule, are contemplated as the second component of the present system. A disclosure of the various epoxy resins may be found in "Epoxy Resins," Lee and Neville (1957).

In some instances, it may be desirable to employ a single compound containing two of the functional groups contemplated, for example, a hydroxyl group and an epoxy group. A typical compound of this type is sold by Shell Chemical Company under its trademark "Epon 1004," this compound being a reaction product of bisphenol-A with epichlorohydrin. Resins of this type are disclosed in the aforementioned Lee and Neville publication as well as the Shell Chemical Company brochure "Epon Resins"—Technical Publication SC: 52–31.

The third principal component, namely compounds containing silicon-nitrogen units, is formed as the result of a reaction between ammonia or primary amines and a halosilane. Halosilanes are defined herein, under the broadest concept, as silicon halide compounds wherein the halogen atoms are attached directly to the silicon. Included within this definition are silicon tetrahalides, such as silicon tetrachloride as well as silicon halides having, in general, the generic formula $$R_nSiHal_{4-n}$$

wherein R is hydrogen or an organic group attached to silicon, such as an alkyl, aryl, aralkyl, alkenyl, alkynyl, alkoxy, aryloxy, thioalkyl, thioaryl and a cyano group as well as organic groups derived from secondary amines, for example, dialkylamino or diarylamino; Hal is a halogen attached to silicon; and $n$ is an integer from 0 to 3. Typical compounds resulting from the reaction of a particular class of halosilanes, namely those halosilanes characterized by the presence of organic groups linked to silicon by a C—Si bond, and ammonia or primary amine are disclosed in Patents 2,564,674; 2,579,416; 2,579,417 and 2,579,418 issued to Nicholas D. Cheronis. An alkoxy-type organic silicon halide and its reaction product with ammonia is described in the Pedlow et al. Patent No. 2,566,363. Also contemplated are the ammonolysis reaction products of the haloalkoxy silicon halides, disclosed in the patent to Rust et al. 2,650,934, these ammonolysis reaction products being further described and claimed in the copending application of Shultz et al., Serial No. 705,470, filed December 27, 1957, now Patent No. 2,970,969.

Reaction products of ammonia or amines with halosilanes, and particularly the hereinafter described polymers, are sometimes referred to as "silamines" or "aminosilanes." The former term will, at times, be used in this specification.

Silamines are considered to have the following general formulas:

$$R_nSi(NH_2)_{4-n} \text{ or } R_nSi(NHR')_{4-n}$$

depending on whether the original halosilane was reacted with ammonia or amine. However, many of the reaction products tend to undergo polymerization, as discussed more in detail hereinbelow. The ammonolysis or aminolysis reactions are normally conducted at room temperature or below in the presence of an inert solvent and in the absence of water to prevent hydrolysis.

In many instances, the number of replaceable halogen atoms attached directly to the silicon atom and the number of amino groups substituted for such atoms is referred to in terms of functionality. For example, if the halosilane contains one replaceable halogen atom, such a halosilane would be referred to as monofunctional. The resultant ammonolysis or aminolysis reaction products would also be referred to as monofunctional. Likewise, a halosilane having two or three replaceable halogen atoms would be referred to as being di or trifunctional compounds, respectively, as would their corresponding ammonia or primary amine reaction products.

The ammonolysis or aminolysis of a monofunctional halosilane will yield a silicon-nitrogen compound containing a single amino group in place of the one chlorine atom. However, as indicated above, it has been found that the tetrafunctional and many of the di and trifunctional ammonolysis or aminolysis reaction products of the corresponding halosilanes, as well as similar products from mixed halosilanes, tend to undergo polymerization at room temperature, forming either resinous liquids or solids, depending upon the particular starting materials. In fact, it has been found difficult or impossible to isolate many of the monomers of the higher functional reaction products. It is understood that polymerization occurs by means of a condensation reaction with the liberation of ammonia. Polymerization of difunctional reaction products, particularly those containing alkyl groups, tend to produce cyclic trimers or tetramers, whereas polymerization of higher functional silicon-nitrogen compounds tend to form straight or branched chain polymers which, in a number of cases, are believed to consist of a plurality of cyclic rings linked together. When mixtures of halosilanes of different functionality are ammonolyzed or aminolyzed, mixtures of separate polymers or copolymer hybrids may be formed, depending upon the type of halosilanes used.

Certain distinctions may be made with respect to ammonolysis as compared to aminolysis in that in the latter type of reaction, there is less of a tendency for the reaction products to undergo the aforementioned polymerization to the extent that shorter polymers may frequently result. Hence, some degree of control of end products may be obtained by appropriate selection of the initial reactants.

Silamines, in many instances, may be used directly without further modification to form films, coatings or as the principal binder for molding compositions. In addition, silamines may be modified to obtain additional properties desired in an end product or may be used as modifying agents for other compounds.

Among the many organic groups which may be attached to the silicon atom of the mono, di or trifunctional silamines contemplated by the present invention, the following are illustrative: (alkyl)-methyl, ethyl, lauryl, isopropyl, tertiary butyl, cyclopropyl, cyclohexyl, and substituted alkyl groups, such as 2-chloroethyl, beta-trichlorosilyl-ethyl; (aryl)-phenyl, alpha or beta-naphthyl and substituted aryl groups, such as para-chlorophenyl, para-trichlorosilylphenyl; (aralkyl)-phenethyl; (alkoxy)-methoxy, tertiary-butoxy; (aryloxy)-phenoxy, and unsaturated groups (alkenyl) vinyl and allyl, (alkynyl) ethynyl. Also contemplated are organic groups, such as (alkylthio) methylthio, ethylthio; (arylthio) phenylthio; and radicals derived from secondary amines, such as dimethylamino, diethylamino and methylphenylamino.

Primary amines which may be used for aminolysis of halosilanes are methylamine, ethylamine, allylamine, ethylenediamine, hexamethylenediamine, aniline, para-phenylenediamine and benzylamine or mixtures of such amines with each other or with ammonia.

In general, the polyfunctional silamines (for example, $n=0–2$) are contemplated as one of the three components of the present system, and particularly those polyfunctional silamines which are polymeric, such that they contain a plurality of functional or reactive Si—N units. Both the intermediate Si—N units, existing internally of a polymeric silamine and containing one hydrogen or substituted group attached to the nitrogen, and the polymer terminal Si—N amino groups having two hydrogen or substituted groups attached to the nitrogen may take part in the present reactions with either a hydroxy or an epoxy group.

The three components contemplated within the present system may be reacted in a variety of combinations to obtain intermediate resinous compositions or final, insoluble, infusible products. A reaction between a silamine and a hydroxy-containing compound results in the liberation of ammonia, whereas in the reaction of a silamine and a compound containing an epoxy group, the nitrogen is chemically bound into the reaction product. Alternately, the epoxy and hydroxyl components may be reacted and the resulting product reacted with the silamine. Further, all three components may be mixed simultaneously.

To achieve desired reactions, it is, of course, necessary to predetermine the stoichiometric quantities of the reactants required. Thus, for example, an epoxy-containing compound having excess epoxy groups, may be reacted with a given amount of hydroxyl-containing compound, with the unreacted epoxy groups available for reaction with the silamine. Likewise, the initial reaction may be one wherein a compound containing excess hydroxyl groups is reacted with a given amount of epoxy compound, the remaining hydroxyl groups being available for reaction with the silamine.

In general, to avoid foaming, hydroxyl-containing compounds should be initially reacted with the silamines and the liberated ammonia permitted to escape, assisted by slight heating, if necessary. The reaction product may then be reacted with the epoxy compound. If a foamed product is desired, the epoxy compound may be initially reacted with the silamine, followed by reaction of the resulting product with a hydroxyl compound.

Reaction of silamines with hydroxyl-containing compounds will usually proceed at ordinary or room temperatures. However, reactions involving epoxy compounds normally require elevated temperatures, generally of the order of 150° C., to accomplish the desired reaction in a reasonable period of time.

As will be observed from the following examples, resinous reaction products may be obtained ranging from highly viscous liquids to rigid, infusible solids. Additionally, intermediate reaction products which are capable of further reaction may be formed for selected uses. The three functional groups of the system, namely the silicon-nitrogen unit of the silamines, the hydroxyl group and the epoxy group enables tailoring of products having a relatively wide range of controllable properties.

Due to their compatibility with many of the currently available hydroxyl and epoxy-containing compounds and as a result of their ease of preparation and corresponding availability, the presently preferred silamines are those having monovalent hydrocarbon radicals attached to the silicon and, particularly, silamines containing the lower alkyls, such as methyl and ethyl radicals, or phenyl groups.

In view of the fact that many of the higher functional silamines tend to polymerize, it may be necessary to retain such silamines in a solvent and conduct desired reactions in solution with the solvent.

The higher the degree of functionality of the various components present, the more cross-linking may be obtained, resulting in hard, dense, infusible products having high heat distortion properties. Correspondingly, complex resinous compositions of intermediate hardness and heat distortion may, likewise, be obtained by appropriate selection of the degree and type of functionality. Fillers, pigments, catalysts or other modifying agents may be included with the present compositions where appropriate.

*Example I*

A silamine was prepared by ammonolyzing in a hexane solution with 1 liter of liquid ammonia, a mixture of 1 gram mole of methyltrichlorosilane and 1 gram mole of dimethyldichlorosilane. After removal of the ammonium chloride precipitate and the hexane solvent, 11.1 parts of the silamine were then mixed with 13.3 parts of bis-phenol-A and 17.8 parts of Shell Chemical Company Epoxy Resin "Epon 828" (the reaction product of bisphenol-A and epichlorohydrin having an epoxy equivalent of 190–210 [grams of resin containing one gram-equivalent of epoxide]), the mixture being formed in the presence of a solvent comprising 31.1 parts of dioxane and 26.7 parts of toluene. A film was formed on a glass surface from the foregoing mixture which was subjected to a cure at 140° C. for sixteen hours. A hard, clear coating resulted which had fair bond to the glass surface and resistance to a knife scratch.

*Example II*

Thirty-six parts of a silamine of Example I, contained in hexane as a solvent, were mixed with 55 parts of Epon 828. The mixture was bodied on a hot plate until the solvent was removed. After removal of the solvent, 9 parts of ethylene glycol were added followed by heating the mixture on a hot plate to 90° C. and then curing for sixteen hours at 150° C. A white, rigid foam was formed.

*Example III*

A silamine was prepared by ammonolyzing, in a hexane solution, phenyltrichlorosilane. 18.2 parts of the silamine in a methylene chloride solution were then mixed with 9.1 parts of Dow Chemical Company Epoxy Resin "X2633.1," the mixture being subjected to a hot plate until the solvent was boiled off. 72.7 parts of a melted Shell Chemical Company "Epon 1001" (having an epoxy value of 0.19–0.20 equivalent/100 grams of resin and a hydroxyl value of 0.32 equivalent/100 grams of resin) were then added to the hot mixture resulting in the immediate formation of a white, rigid foam. The system was then subjected to a cure at 150° C. for forty-five minutes. The cured foam was cut with a saw and withstood vigorous pounding with a hammer without crumbling. The rigid foam was also floated on water for approximately thirty days without any adverse effect. A sample of the foam was also held under water for three days by the use of a weight. Upon removal of the weight, the foam readily floated on the surface.

*Example IV*

A silamine was prepared by ammonolyzing in a hexane solution a mixture of 4 gram moles of methyltrichlorosilane and 1 gram mole of dimethyldichlorosilane. Forty parts of the silamine were mixed with 60 parts of 2,3-epoxy-2-ethylhexanol and heated for twenty hours at 150° C. The resulting product was a highly viscous liquid.

*Example V*

A silamine was prepared by ammonolyzing in a hexane solution equal molar parts of dimethyldichlorosilane and phenyltrichlorosilane. Twenty parts of the resulting silamine were mixed with 20 parts of Epon 828 and 60 parts of corn starch. The mixture was molded in a press for twenty minutes at 165° C. resulting in the formation of a hard bar.

*Example VI*

To 16.7 parts of the silamine of Example V were added 16.7 parts of Epon 828 and 66.6 parts of Elvanol 72-60 (polyvinyl alcohol). The components were thoroughly mixed and subjected to the same molding operation of Example V. A clear, hard bar was formed and was found to have a heat distortion of 66° C. and a flexural strength of 8,650 pounds per square inch.

*Example VII*

A silamine was prepared by ammonolyzing in a hexane solvent a mixture comprising 1 mole of silicon tetrachloride and 3 moles of diphenyldichlorosilane. Six grams of the silamine in hexane were mixed with 10 grams of Epi-Rez 5021 (Jones-Dabney) and the mixture heated in an oven to 150° C. Ten grams of cold resorcinol were then added to the mass at 145° C. with immediate reaction taking place. The resulting product was cured for one hour at 150° C. forming a tough, brown rubbery foam.

We claim:

1. A resinous composition of matter comprising the product of the reaction of (1) the polymeric reaction product of a member of the class consisting of ammonia and a primary amine with a halosilane having the generic formula $$R_nSiHal_{4-n}$$

wherein R is an organic group and $n$ is an integer from 0–2, said polymeric reaction product being characterized by having a silicon-nitrogen-silicon linkage as part of its molecular structure; (2) a compound containing a plurality of epoxide groups

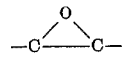

and (3) an organic compound containing a plurality of hydroxyl groups.

2. A composition as described in claim 1 wherein R is a monovalent hydrocarbon radical and $n$ is an integer from 1–2.

3. A composition as described in claim 2 wherein said epoxy compound is the polyglycidyl ether of a polyhydroxy phenol.

4. A composition as described in claim 3 wherein said compound containing a plurality of hydroxyl groups is a bisphenol.

5. A composition as described in claim 3 wherein said compound containing a plurality of hydroxyl groups is the permanently fusible condensation product of a phenol and an aldehyde.

6. A resinous composition of matter comprising the product of the reaction of (1) the polymeric reaction product of a member of the class consisting of ammonia and a primary amine with a mixture of halosilanes having the generic formulas $$RSiHal_3$$

and $$R_2SiHal_2$$

wherein R is a monovalent hydrocarbon radical, said polymeric reaction product being characterized by having a silicon-nitrogen-silicon linkage as part of its molecular structure; (2) a polyepoxy compound having a plurality of epoxide groups

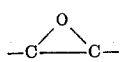

and (3) an organic polyhydroxyl compound.

7. A composition as described in claim 6 wherein said mixture of halosilanes comprises methyltrichlorosilane and dimethyldichlorosilane.

8. A composition as described in claim 7 wherein said polyepoxy compound is the polyglycidyl ether of a polyhydroxy phenol.

9. A composition as described in claim 6 wherein said mixture of halosilanes comprises dimethyldichlorosilane and phenyltrichlorosilane.

10. A method of producing a resinous composition which comprises mixing (1) the polymeric reaction product of a member of the class consisting of ammonia and a primary amine with a halosilane having the generic formula $$R_nSiHal_{4-n}$$

wherein R is an organic group and $n$ is an integer from 0–2, said polymeric reaction product being characterized by having a silicon-nitrogen-silicon linkage as part of its molecular structure; (2) a compound containing a plurality of epoxide groups

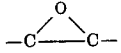

and (3) an organic compound containing a plurality of hydroxyl groups.

11. The method as described in claim 10 wherein R is a monovalent hydrocarbon and $n$ is an integer from 1-2.

12. The method as described in claim 11 wherein said epoxy compound is the polyglycidyl ether of a polyhydroxyl phenol.

13. The method as described in claim 12 wherein said compound containing a plurality of hydroxyl groups is a bisphenol.

14. The method as described in claim 12 wherein said compound containing a plurality of hydroxyl groups is the permanently fusible condensation product of a phenol and an aldehyde.

15. A method of producing a resinous composition which comprises mixing (1) the polymeric reaction product of a member of the class consisting of ammonia and a primary amine with a mixture of halosilanes having the generic formulas $$RSiHal_3$$

and $$R_2SiHal_2$$

wherein R is a monovalent hydrocarbon radical, said polymeric reaction product being characterized by having a silicon-nitrogen-silicon linkage as part of its molecular structure; (2) a polyepoxy compound having a plurality of epoxide groups $$-C\overset{O}{\underset{}{\diagdown}}C-$$

and (3) an organic polyhydroxyl compound.

16. A method as described in claim 15 wherein said mixture comprises methyltrichlorosilane and dimethyldichlorosilane.

17. A method as described in claim 16 wherein said polyepoxy compound is the polyglycidyl ether of a polyhydroxy phenol.

18. A method as described in claim 15 wherein said mixture comprises dimethyldichlorosilane and phenyltrichlorosilane.

19. A method of producing a light-weight, infusible product which comprises (1) heating a mixture of a polyepoxy compound having a plurality of epoxide groups $$-C\overset{O}{\underset{}{\diagdown}}C-$$

and a stoichiometric excess of the polymeric reaction product of a member of the class consisting of ammonia and a primary amine with a halosilane having the generic formula $$R_nSiHal_{4-n}$$

wherein R is a monovalent hydrocarbon radical and $n$ is an integer from 1-2, said polymeric reaction product being characterized by having a silicon-nitrogen-silicon linkage as part of its molecular structure, and (2) mixing an organic polyhydroxyl compound with the reaction product of said first mixture.

20. A method of producing a hard, dense, infusible product which comprises (1) reacting an organic polyhydroxyl compound with a stoichiometric excess of the polymeric reaction product of a member of the class consisting of ammonia and a primary amine with a halosilane having the generic formula $$R_nSiHal_{4-n}$$

wherein R is a monovalent hydrocarbon radical and $n$ is an integer from 1-2, said polymeric reaction product being characterized by having a silicon-nitrogen-silicon linkage as part of its molecular structure, and (2) heating a mixture of the reaction product of (1) with a polyepoxy compound having a plurality of epoxide groups $$-C\overset{O}{\underset{}{\diagdown}}C-$$

at elevated temperature until a hard dense infusible product is formed.

21. A method of producing an infusible product which comprises forming a mixture comprising (1) the polymeric reaction product of a member of the class consisting of ammonia and a primary amine with a halosilane having the generic formula $$R_nSiHal_{4-n}$$

wherein R is a monovalent hydrocarbon radical and $n$ is an integer from 1-2, said polymeric reaction product being characterized by having a silicon-nitrogen-silicon linkage as part of its molecular structure; (2) an organic polyhydroxyl compound, and (3) a polyepoxy compound having a plurality of epoxide groups $$-C\overset{O}{\underset{}{\diagdown}}C-$$

and heating said mixture until said mixture is converted into an infusible form.

22. A product made in accordance with claim 19.
23. A product made in accordance with claim 20.
24. A product made in accordance with claim 21.

References Cited in the file of this patent

UNITED STATES PATENTS

| | | |
|---|---|---|
| 2,635,059 | Chernonis | Apr. 14, 1953 |
| 2,695,276 | Hatcher | Nov. 23, 1954 |
| 2,876,209 | Benneville et al. | Mar. 3, 1959 |

FOREIGN PATENTS

| | | |
|---|---|---|
| 202,627 | Australia | July 20, 1956 |